US007070708B2

(12) United States Patent
Iyengar et al.

(10) Patent No.: US 7,070,708 B2
(45) Date of Patent: Jul. 4, 2006

(54) MAGNETORHEOLOGICAL FLUID RESISTANT TO SETTLING IN NATURAL RUBBER DEVICES

(75) Inventors: Vardarajan R. Iyengar, Macomb, MI (US); Patrick N. Hopkins, Farmington Hills, MI (US); Mark E. Myers, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/836,891

(22) Filed: Apr. 30, 2004

(65) Prior Publication Data

US 2005/0242321 A1 Nov. 3, 2005

(51) Int. Cl.
*H01F 1/44* (2006.01)
(52) U.S. Cl. .................. 252/62.52; 188/267.1; 188/267.2; 267/140.45; 267/140.15
(58) Field of Classification Search ............. 252/62.52; 188/267.1, 267.2; 267/140.45, 140.15
See application file for complete search history.

(56) References Cited

U.S. PATENT DOCUMENTS

| | | | | |
|---|---|---|---|---|
| 2,575,360 | A | 11/1951 | Rabinow | 252/62.52 |
| 4,957,644 | A | 9/1990 | Price et al. | 252/62.52 |
| 4,992,190 | A | 2/1991 | Shtarkman | 252/62.52 |
| 5,167,850 | A | 12/1992 | Shtarkman | 252/62.52 |
| 5,354,488 | A | 10/1994 | Shtarkman et al. | 252/62.56 |
| 5,382,373 | A * | 1/1995 | Carlson et al. | 252/62.55 |
| 5,578,238 | A | 11/1996 | Weiss et al. | 252/62.52 |
| 5,599,474 | A | 2/1997 | Weiss et al. | 252/62.52 |
| 5,645,752 | A | 7/1997 | Weiss et al. | 252/62.54 |
| 5,667,715 | A | 9/1997 | Foister | 252/62.52 |
| 5,670,077 | A | 9/1997 | Carlson et al. | 252/62.52 |
| 5,683,615 | A | 11/1997 | Munoz | 252/62.52 |
| 5,705,085 | A | 1/1998 | Munoz et al. | 252/62.52 |
| 5,842,547 | A | 12/1998 | Carlson et al. | 188/267 |
| 5,900,184 | A | 5/1999 | Weiss et al. | 252/62.52 |
| 5,906,767 | A | 5/1999 | Karol et al. | 252/62.52 |
| 5,985,168 | A | 11/1999 | Phule | 252/62.52 |
| 5,989,447 | A | 11/1999 | Podszun et al. | 252/62.52 |
| 6,027,664 | A | 2/2000 | Weiss et al. | 252/62.52 |
| 6,036,765 | A | 3/2000 | Farrow et al. | 106/487 |
| 6,132,633 | A | 10/2000 | Carlson | 252/62.52 |
| 6,149,832 | A | 11/2000 | Foister | 252/62.52 |
| 6,186,290 | B1 | 2/2001 | Carlson | 188/164 |
| 6,203,717 | B1 | 3/2001 | Munoz et al. | 252/62.52 |
| 6,395,193 | B1 | 5/2002 | Kintz et al. | 252/62.52 |
| 6,451,219 | B1 | 9/2002 | Iyengar et al. | 252/42.52 |
| 6,547,983 | B1 | 4/2003 | Iyengar | 252/62.52 |
| 6,599,439 | B1 | 7/2003 | Iyengar et al. | 252/62.52 |
| 6,679,999 | B1 * | 1/2004 | Iyengar et al. | 252/62.52 |

OTHER PUBLICATIONS

Hamill et al., *Fine Particle Atomization Technology*, Eurotech Conference Proceedings, Munich. Oct. 1999.
Hamill et al., *Water Atomized Fine Powder Technology*, http://www.hoeganaes.com/home.htm, 4 pp, date unknown.

* cited by examiner

*Primary Examiner*—C. Melissa Koslow
(74) *Attorney, Agent, or Firm*—Michael D. Smith

(57) ABSTRACT

A MR fluid formulation based upon a silicone liquid vehicle thickened with a treated fumed metal oxide and doped with one or more chemicals having hydrogen-bonding capability for use with natural rubber mounts. The MR fluid is resistant to settling of the magnetizable particles upon contact of the fluid with natural rubber. In one exemplary embodiment, the doping chemical is one or a combination of propylene glycol and a bifunctional ethoxylated amine.

17 Claims, 3 Drawing Sheets

MAGNETORHEOLOGICAL FLUID RESISTANT TO SETTLING IN NATURAL RUBBER DEVICES

TECHNICAL FIELD

This invention relates to magnetorheological (MR) fluids, and more specifically, to MR fluids compatible with natural rubber formulations.

BACKGROUND OF THE INVENTION

Magnetorheological (MR) fluids are substances that exhibit an ability to change their flow characteristics by several orders of magnitude and in times on the order of milliseconds under the influence of an applied magnetic field. The utility of these materials is that suitably configured electromechanical actuators that use a MR fluid can act as a rapidly responding active interface between computer-based sensing or controls and a desired mechanical output. With respect to automotive applications, such materials are seen as a useful working media in shock absorbers, for controllable suspension systems, vibration dampers in controllable power train and engine mounts, and in numerous electronically controlled force/torque transfer (clutch) devices. The MR mounts are controllable mounts that can provide vibration damping over a wide range of frequencies. In engine and power train mount applications, for example, a MR fluid is used in place of conventional hydraulic fluid, and a coil assembly replaces the orifice track used in hydraulic mounts. FIG. 1 depicts in cross-sectional view a typical MR fluid mount 10 having a coil assembly 12 incorporated into an orifice plate assembly 14, which separates an upper chamber 16 from a lower chamber 18 and contains an annular flow passage for the MR fluid 20. The coil assembly 12 can be energized to generate a magnetic field across the annular flow path of the MR fluid 20 as it flows between the upper and lower chambers 16, 18. These chambers 16, 18 are typically made of natural rubber formulations, with or without metallic inserts. The strength of the magnetic field can be varied to provide variable damping.

MR fluids are non-colloidal suspensions of finely divided low coercivity magnetizable solids, such as iron, nickel, cobalt and their magnetic alloys dispersed in a base carrier liquid. MR mounts have typically been made with glycol-based carrier fluids. These fluids have the advantages of being inexpensive and compatible with natural rubber. However, durability testing with these fluids has been unsuccessful because the fluids settle appreciably under durability test conditions. Because MR fluids contain non-colloidal solid particles that are often 7–8 times more dense than the liquid phase in which they are suspended, suitable dispersions of the particles in the liquid phase must be prepared so that the particles do not settle appreciably upon standing nor during use.

Silicone-based MR fluids have also been tested for use in MR mounts. However, these fluids also exhibit severe settling, as depicted in FIG. 2. FIG. 2 shows the variation of on-state and off-state forces for MR mounts using a silicone-based MR fluid over the course of durability testing. The MR fluid contained 20 wt. % carbonyl iron particles dispersed in silicone oil having a viscosity of 50 cSt, 12 wt. % surface treated fumed silica (Cab-O-Sil® TS-720 from Cabot Corporation), and no additives. It can be seen from FIG. 2 that these mounts exhibit a precipitous drop in the on-state force after a few hours of durability testing. One commercially available silicone-based MR fluid that is specifically recommended by the manufacturer for use in natural rubber mounts, specifically Lord MR Fluid No. MRF336AG, was also tested and exhibited severe settling when exposed to the natural rubber mount components during component testing.

The magnetizable particles are kept in suspension by dispersing a thickening agent, such as fumed or precipitated silica, into the formulation. Silica stabilizes the MR fluid by forming a network through hydrogen bonding between silica particles. This network breaks down under shear and reforms upon cessation of shear to keep the magnetizable particles suspended while exhibiting low viscosity under shear. Fumed silica is preferred as a thickener, and is typically surface treated. Despite the presence of the thickeners in the MR fluids, severe settling is occurring during durability testing of the MR fluids in natural rubber-based mounts.

There is thus a need to develop a MR fluid formulation that is compatible with natural rubber and is resistant to settling in devices where the fluid is in contact with natural rubber.

SUMMARY OF THE INVENTION

The present invention provides a MR fluid formulation based upon a silicone liquid vehicle thickened with a treated fumed metal oxide and doped with one or more chemicals having hydrogen bonding capability so as to provide compatibility with natural rubber mounts and to resist settling of the magnetizable particles upon contact of the fluid with natural rubber. In exemplary embodiments of the present invention, the liquid vehicle is low viscosity silicone oil, the thickening agent is treated fumed silica, and the doping chemical is one or a combination of propylene glycol and a bifunctional ethoxylated amine.

The present invention further provides a magnetorheological device comprising a chamber made of a natural rubber compound, a magnetic field source for creating an applied magnetic field in the chamber, and a magnetorheological fluid having the formulation described herein within the chamber and in physical contact with the natural rubber compound, wherein the magnetorheological fluid is capable of changing its flow behavior in response to the applied magnetic field and is compatible with the natural rubber compound.

BRIEF DESCRIPTION OF THE DRAWINGS

The present invention will now be described, by way of example, with reference to the accompanying drawings, in which.

DETAILED DESCRIPTION

Figure 1:
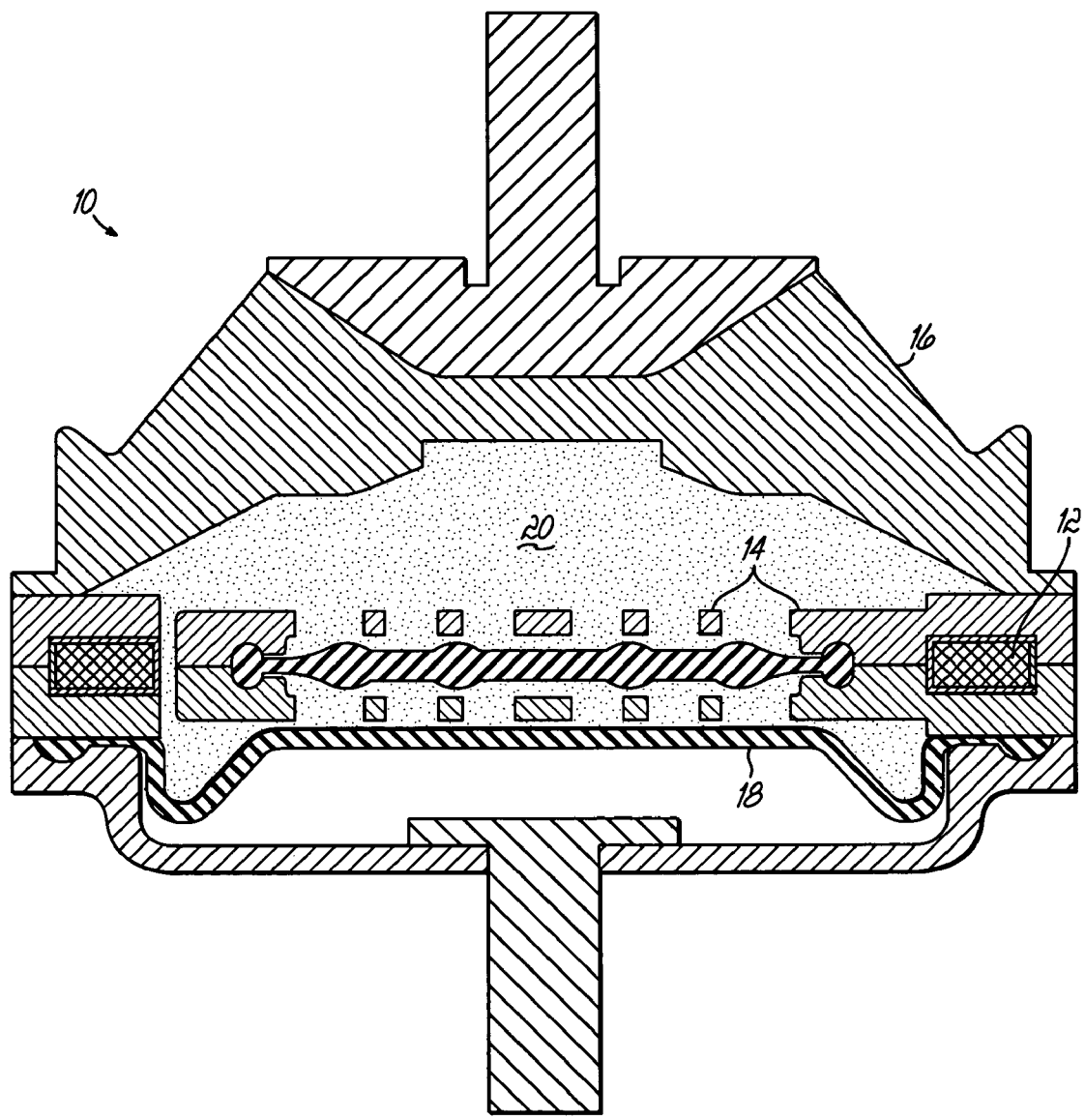
FIG. 1 is a schematic cross-sectional view of a typical MR mount of the prior art in which a MR fluid of the present invention may be utilized.

The present invention provides a MR fluid formulation that is highly resistant to settling in a natural rubber MR mount. The MR fluid of the present invention is a silicone-based MR fluid that does not react with natural rubber formulations used in MR mounts, and thus, does not experience the settling observed with prior art MR formulations. To this end, magnetizable particles are dispersed in a mixture of a silicone-based liquid vehicle, a thickening agent and at least one doping chemical. The thickening agent is a treated fumed metal oxide and the doping chemical includes at least two hydroxyl functional groups capable of hydrogen bonding.

After a detailed investigation into the cause of fluid settling in MR mounts, and without intending to be bound by theory, it is believed that MR fluids settle as a result of the interaction between the thickeners used in the MR fluids and certain ingredients that are extracted from the natural rubber compound in the course of durability testing and/or use of the fluid in the MR mount. Specifically, the network formed between metal oxide particles, such as fumed silica particles, is believed to be attacked by ingredients that are extracted from the natural rubber compound when exposed to the MR fluid. The ingredients extracted from the natural rubber compound include organic acids, hydrocarbon oils (both aliphatic and aromatic), curative agents, antioxidants, and anti-aging agents. For example, harmful ingredients in the rubber mounts may include naphthenic oil, aromatic oil, stearic acid, butyl tuads, Vanax® A, Vanax® NS and Antozite® 67P. These ingredients are essential to the rubber formulation and cannot be removed therefrom without significantly compromising the properties of the rubber mount. Thus, the present invention provides a MR fluid formulation containing one or more doping chemicals that prevent the interaction between the thickener in the MR fluid and the extracted ingredients of the rubber formulation for the MR mount, or alternatively, that repair or reinforce the network compromised by the attack from the extracted ingredients. The doping chemicals each contain at least two hydroxyl functional groups capable of hydrogen bonding between thickener particles, thereby bridging them and reinforcing the network. This network reinforcement via hydrogen bonding with bifunctional doping agents causes the MR fluid of the present invention to resist settling when attacked by rubber compound additives.

Specifically, the MR fluid of the present invention comprises magnetic particles suspended in a silicone-based liquid medium, such as a low-viscosity silicone oil, by means of a treated fumed metal oxide thickener, such as surface-treated fumed silica, and at least one doping chemical compound designed to provide enhanced resistance to settling in the presence of a natural rubber formulation. The doping chemical compounds useful in the present invention are from a general class of compounds that contain bifunctional, trifunctional or multi-functional hydroxyl groups capable of hydrogen bonding. Examples include: ethylene glycol; propylene glycol; ethoxylated amines, diamines and etheramines; proproxylated amines, diamines and etheramines; glycerol; and the like.

In an exemplary embodiment of the present invention, the amount of doping chemicals in the fluid is between 0.1 and 10% by weight of the liquid for each doping chemical. Exemplary doping chemicals include propylene glycol at a concentration between 0.1 and 10% by weight of the liquid or a bifunctional ethoxylated amine, such as Ethomeen® T-15 (Akzo Chemicals) at a concentration of between 0.1 and 10% by weight of the liquid. In a further exemplary embodiment of the present invention, the doping chemicals include a mixture of 0.5 to 3% by weight each of propylene glycol and a bifunctional ethoxylated amine. Both of these doping chemical compounds are characterized by the presence of two hydroxyl functional groups that are capable of hydrogen bonding with other polar compounds that include hydroxyl functionality. It has been implied in technical publications that bifunctional chemical compounds are incapable of strengthening the network of surface-treated fumed silica due to the lack of available hydroxyl surface groups on the silica for hydrogen bonding due to the surface treatment. However, it has been unexpectedly found that these types of chemical compounds do provide a vast improvement in the network strength, and consequently the settling performance, of MR fluid systems thickened with surface-treated fumed metal oxides when the liquid vehicle is a silicone-based fluid and when the MR fluid is in contact with natural rubber.

It was further unexpectedly found that there is a synergistic reinforcement provided by the combination of propylene glycol and bifunctional ethoxylated amine, wherein the combined effect of the two doping chemical compounds together is significantly higher than the effects of the individual doping chemicals. For example, the use of both doping chemicals together at 1% by weight each provides better performance enhancement than that obtained by using either doping chemical separately. While these exemplary doping chemicals include bifunctional hydroxyl group compounds, the present invention anticipates that trifunctional or greater compounds will also achieve the strengthening of the network through particle bridging on adjacent metal oxide particles.

Figure 2:
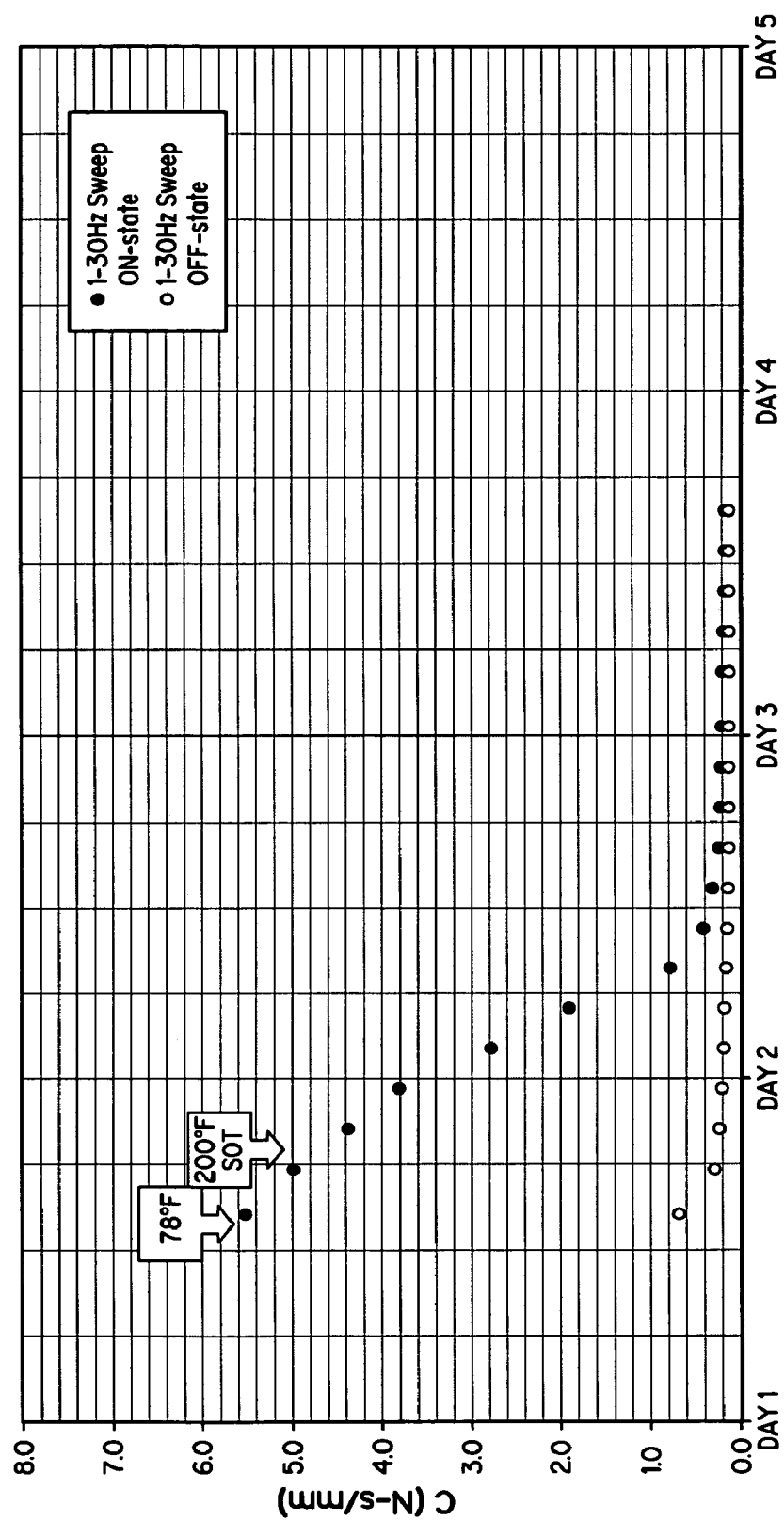
FIG. 2 is a plot showing variations in on-state and off-state forces for MR mounts using silicone-based MR fluids of the prior art.
Figure 3:
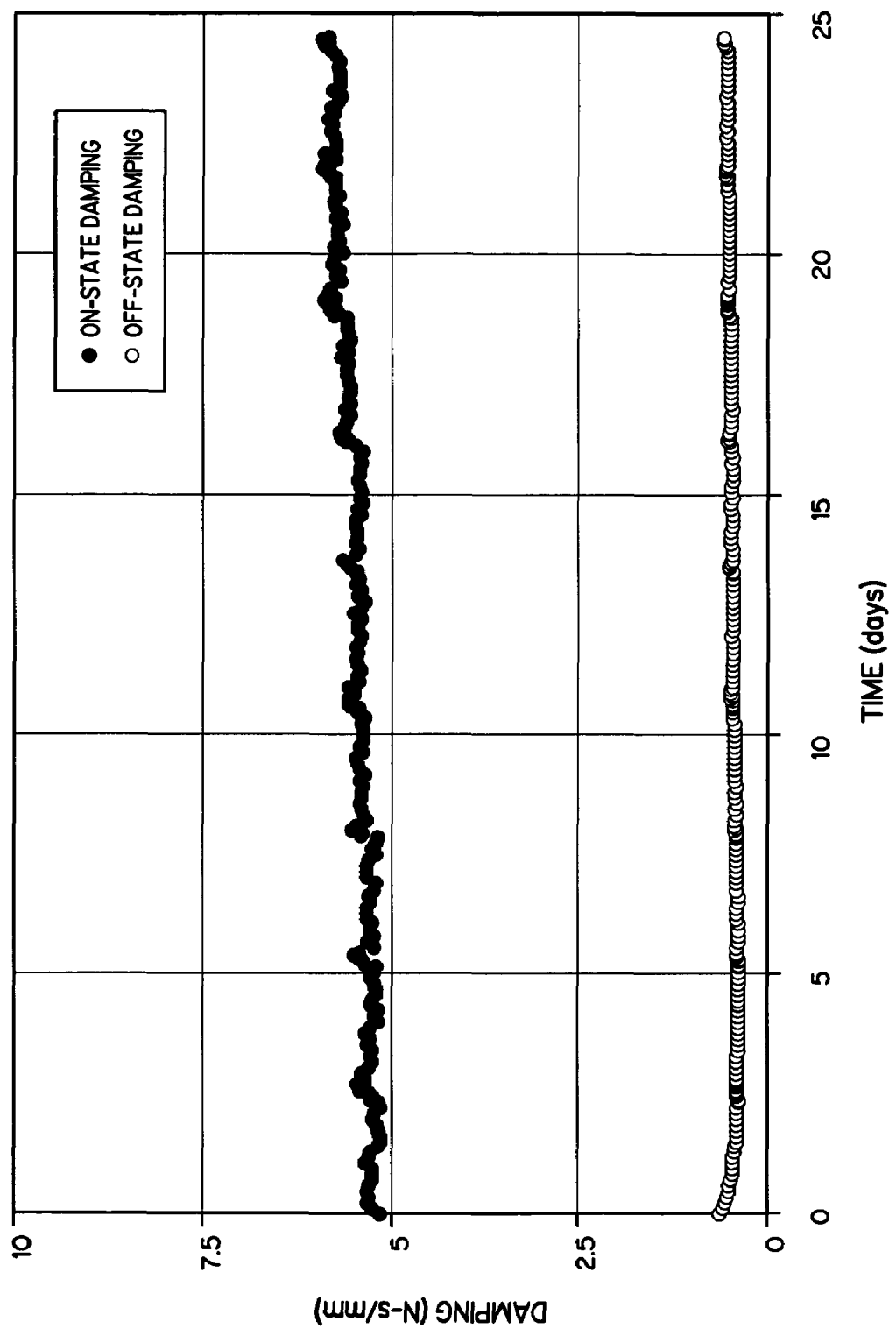
FIG. 3 is a plot showing variations in the on-state and off-state forces for MR mounts using a silicone-based MR fluid of the present invention.

FIG. 3 shows the variation of the on-state and off-state forces during durability testing of a MR mount using a silicone-based MR fluid of the present invention doped with propylene glycol and Ethomeen® T-15, both at a concentration of 1% by weight of the liquid vehicle. More specifically, the MR fluid contained 20 wt. % carbonyl iron particles dispersed in silicone oil having a viscosity of 50 cSt, 12 wt. % surface treated fumed silica (Cab-O-Sil® TS-720 from Cabot Corporation), and no additives other than the aforementioned doping agents. FIG. 3 shows that both the on-state and off-state forces are consistent over the entire durability test that spans three weeks of continuous testing. This is a significant improvement over the behavior of the un-doped silicone-based MR fluid of the same formulation tested in an identical mount, as shown in FIG. 2, where a significant decrease in the on-state forces occurred after only a few hours of durability testing.

The magnetizable particles in the MR fluid formulation of the present invention are magnetizable ferromagnetic, low coercivity (i.e., little or no residual magnetism when the magnetic field is removed), finely divided particles, and may include any known particle type for MR fluids, including iron, iron oxides, carbonyl iron, atomized iron, high-pressure water-atomized iron, stainless steel, atomized stainless steel, nickel, cobalt, vanadium, manganese, or alloys thereof. Generally, the magnetizable particles comprise 5–50 wt. % of the MR fluid, with 20 wt. % being exemplary. In an exemplary embodiment, the particles are spherical or nearly spherical in shape and have a diameter in the range of about 1 to 100 μm. Because the particles are employed in non-colloidal suspensions, it may be advantageous for the particles to be at the small end of the suitable range. The magnetizable particles may also have a bimodal size distribution, such as that described in U.S. Pat. No. 5,667,715, issued Sep. 16, 1997, entitled "Magnetorheological Fluids" incorporated by reference herein in its entirety. For example, the magnetizable particles may be a mixture of spherical particles in the range of 1 to 100 μm in diameter with two distinct particle size members present, one a relatively large particle size that is 5 to 10 times the mean diameter of the relatively small particle size component. In another exemplary embodiment, the particles may be iron powder having a passivating oxide layer thereon, produced by a controlled, water atomization process and having a smooth, generally spherical shape, a narrow size distribution, and a mean diameter in the range of about 8–25 μm, as described in application Ser. No. 10/292,075, now U.S. Pat. No. 6,787,059 issued Sep. 7, 2004, entitled "Low-Cost MR Fluids With Powdered Iron," commonly owned, and incorporated by reference herein in its entirety. In yet another exemplary embodiment, the magnetizable particles may also be atomized magnetic stainless steel particles as disclosed in U.S. Pat. No. 6,679,999 entitled "MR Fluids Containing Magnetic Stainless Steels," commonly owned, and incorporated by reference herein in its entirety.

In an exemplary embodiment, the silicone-based liquid vehicle is a silicone oil or silicone copolymer. For example, the fluid may be low viscosity silicone oil having a viscosity of 10–200 cSt (at 25° C.), such as Dow Corning 200 Fluid or Syltherm 800 fluid, each from Dow Corning Co.

In an exemplary embodiment, the fumed metal oxide thickener is added to the liquid vehicle in an amount of 5–15% by weight of the liquid vehicle. The fumed metal oxide thickener may be any surface treated fumed metal oxide, including silica, titania or alumina, or combinations thereof. In an exemplary embodiment, the thickener is a fully treated fumed silica, such as Cab-O-Sil® TS-720 from Cabot Corporation. A common treatment of fumed silica is a polymer coating, such as a silane treatment. The surface treatment takes up hydrogen bonding sites on the metal oxide particle surfaces, making them unavailable for network formation. Thus, in treated fumed metal oxides, network formation is primarily achieved through interaction of the coated polymer chains. In silicone oil, untreated fumed silica does not form a strong network, whereas treated fumed silica does, which is generally the reverse of what is found in hydrocarbon-based systems. In the presence of extracted ingredients from natural rubber, the network is weakened significantly, possibly by attack of the polymer chains, thereby breaking the formation therebetween. The extracted ingredients may also free up hydrogen bonding sites on the metal oxide particles, though the exact mechanism occurring may not be fully understood. However, without intending to be bound by theory, it is believed that the functional groups in the doping chemicals form bridges between freed up hydrogen bonding sites or between polymer chains to repair or reinforce the network, thereby thickening the fluid and preventing particle settling. Alternatively, it is also possible that the doping chemicals prevent the extracted ingredients from attacking the network, perhaps by tying them up. Regardless of the precise mechanism, the doping chemicals enable the MR fluid of the present invention to be used in natural rubber mounts without experiencing significant settling of the magnetizable particles during use.

The present invention also provides a MR device in which the MR fluid formulation described herein is particularly suitable. The device comprises a chamber made of a natural rubber compound, such as the chamber arrangement depicted in FIG. 1. The device also includes a magnetic field source for creating an applied magnetic field in the chamber. A MR fluid having the formulation described herein is provided within the chamber and is in physical contact with the natural rubber compound. The MR fluid is capable of changing its flow behavior in response to the applied magnetic field; specifically, the MR fluid drastically thickens or gels to provide vibration damping. By virtue of the doping chemical, the MR fluid is compatible with the natural rubber compound and resists settling of the magnetizable particles during prolonged durability testing and consequently during prolonged usage in an MR mount, for example, a mount in a vehicle.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A magnetorheological fluid formulation comprising magnetizable particles dispersed in a mixture of a silicone-based liquid vehicle, a thickening agent and at least one doping chemical, wherein the thickening agent is a surface treated fumed metal oxide and the at least one doping chemical comprises 0.1–10 wt. % propylene glycol and 0.1–10 wt. % of a bifunctional ethoxylated amine, based upon the weight of the liquid vehicle.

2. The fluid formulation of claim 1 wherein the liquid vehicle is low viscosity silicone oil.

3. The fluid formulation of claim 1 wherein the thickening agent is surface treated fumed silica.

4. The fluid formulation of claim 1 wherein the metal oxide of the thickening agent is selected from the group consisting of silica, titania, alumina, and mixtures thereof.

5. The fluid formulation of claim 1 wherein the doping chemical includes 0.5–3 wt. % propylene glycol, based upon the weight of the liquid vehicle.

6. The fluid formulation of claim 1 wherein the doping chemical includes 0.5–3 wt. % of the bifunctional ethoxylated amine, based upon the weight of the liquid vehicle.

7. The fluid formulation of claim 1 wherein the doping chemical includes 0.5–3 wt. % propylene glycol and 0.5–3 wt. % of the bifunctional ethoxylated amine, based upon the weight of the liquid vehicle.

8. The fluid formulation of claim 1 wherein the liquid vehicle is low viscosity silicone oil, and the thickening agent is surface treated fumed silica.

9. A magnetorheological device comprising:
a chamber comprising a natural rubber compound,
a magnetic field source for creating an applied magnetic field in the chamber, and
a magnetorheological fluid within the chamber and in physical contact with the natural rubber compound, wherein the magnetorheological fluid is capable of changing its flow behavior in response to the applied magnetic field, wherein the magnetorheological fluid comprises magnetizable particles dispersed in a mixture of a silicone-based liquid vehicle, a thickening agent and at least one doping chemical, and wherein the thickening agent is a surface treated fumed metal oxide and the at least one doping chemical comprises bonding 0.1–10 wt. % propylene glycol and 0.1–10 wt. % of a bifunctional ethoxylated amine, based upon the weight of the liquid vehicle.

10. The magnetorheological device of claim 9 wherein the device is a controllable mount.

11. The magnetorheological device of claim 9 wherein the liquid vehicle is low viscosity silicone oil.

12. The magnetorheological device of claim 9 wherein the thickening agent is surface treated fumed silica.

13. The magnetorheological device of claim 9 wherein the metal oxide of the thickening agent is selected from the group consisting of silica, titania, alumina, and mixtures thereof.

14. The magnetorheological device of claim 9 wherein the doping chemical includes 0.5–3 wt. % propylene glycol, based upon the weight of the liquid vehicle.

15. The magnetorheological device of claim 9 wherein the doping chemical includes 0.5–3 wt. % of the bifunctional ethoxylated amine, based upon the weight of the liquid vehicle.

16. The magnetorheological device of claim 9 wherein the doping chemical includes 0.5–3 wt. % propylene glycol and 0.5–3 wt. % of the bifunctional ethoxylated amine, based upon the weight of the liquid vehicle.

17. The magnetorheological device of claim 9 wherein the liquid vehicle is low viscosity silicone oil, and the thickening agent is surface treated fumed silica.

* * * * *